(12) United States Patent
Hiller et al.

(10) Patent No.: US 9,600,833 B1
(45) Date of Patent: Mar. 21, 2017

(54) DUPLICATE KEYWORD SELECTION

(75) Inventors: Matthew Hiller, New York, NY (US);
Igor Tandetnik, Forest Hill, NY (US);
Art Komninos, Stamford, CT (US);
Theodore Power, New York, NY (US);
Ritcha Gupta Ranjan, New York, NY (US);
Ilan Caron, New York, NY (US);
Michael Loose, Hamburg (DE)

(73) Assignee: Google Inc., Mountain View, CA (US)

( * ) Notice: Subject to any disclaimer, the term of this patent is extended or adjusted under 35 U.S.C. 154(b) by 2076 days.

(21) Appl. No.: 12/570,124

(22) Filed: Sep. 30, 2009

Related U.S. Application Data (60) Provisional application No. 61/184,976, filed on Jun. 8, 2009.

(51) Int. Cl.
*G06Q 30/00* (2012.01)
*G07G 1/14* (2006.01)
*G06Q 30/02* (2012.01)

(52) U.S. Cl.
CPC ......... *G06Q 30/0256* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 5,793,495 A * | 8/1998 | Klotz, Jr. | 358/296 |
| 7,698,315 B2 | 4/2010 | Colace et al. | |
| 7,725,464 B2 * | 5/2010 | Grubb et al. | 707/723 |
| 2004/0181392 A1 * | 9/2004 | Parikh et al. | 704/10 |
| 2009/0006391 A1 * | 1/2009 | Ram | 707/6 |
| 2009/0299998 A1 * | 12/2009 | Kim | 707/5 |

* cited by examiner

*Primary Examiner* — Colleen Hoar
(74) *Attorney, Agent, or Firm* — Fish & Richardson P.C.

(57) ABSTRACT

A duplicate keyword selection engine facilitates identification and selection of duplicate keywords that are associated with advertisements and advertising campaigns. The selection engine selects duplicate keywords from one or more sets of duplicate keywords. The duplicate keywords can be selected based on selection criterion specified by the advertiser. The selection criterion for selecting duplicate keywords for inclusion in set of duplicate keywords can be a relative attribute value that a keyword must have relative to attribute values of other keywords in the set of duplicate keywords to which the keyword belongs. For example, the selection criterion can require a duplicate keyword to have a highest attribute value relative to attribute values of the other keywords in the set of duplicate keywords.

23 Claims, 6 Drawing Sheets

DUPLICATE KEYWORD SELECTION

CROSS-REFERENCE TO RELATED APPLICATIONS

This application claims priority to U.S. Provisional Application Ser. No. 61/184,976, titled "Duplicate Keyword Selection," filed on Jun. 8, 2009, the disclosure of which is incorporated herein by reference in its entirety.

BACKGROUND

This document relates to information processing and selection.

The Internet enables access to a wide variety of resources. For example, video, audio, webpages directed to particular subject matter, news articles, images, and other resources are accessible over the Internet. The wide variety of resources that are accessible over the Internet has enabled opportunities for advertisers to provide targeted advertisements with the resources. For example, an advertisement can be targeted for presentation with resources directed to subject matter to which the advertisement is relevant.

The subject matter to which an advertisement is relevant can be identified from keywords that are associated with the advertisement. For example, an advertisement for basketballs being sold by a sporting goods store can be associated with the keyword "basketball." Advertisements can be selected for presentation when resources relevant to the keyword are provided. For example, advertisements associated with keyword "basketball" can be provided with a search results webpage that is provided in response to a search query "basketball." Similarly, advertisements can be presented with other resources that are relevant to keywords associated with the advertisements.

Advertisers can associate keywords with advertisements by providing keywords to an advertisement management system that manages presentation of the advertisement. Advertisers can also associate keywords with advertisements by using keyword suggestion tools or other tools that automatically generate keywords for the advertisement based, for example, on content of the advertisement or performance of the advertisement when presented with resources relevant to a particular topic. Because there are different ways in which advertisers can associate keywords with an advertisement or an advertisement campaign, duplicate instances of keywords can be associated with an advertisement or advertisements in an advertisement campaign.

SUMMARY

A duplicate keyword selection engine ("selection engine") facilitates identification and selection of duplicate keywords that are associated with advertisements and advertising campaigns. The selection engine selects duplicate keywords from one or more sets of duplicate keywords. The duplicate keywords can be selected based on selection criterion specified by the advertiser. The selection criterion for selecting duplicate keywords for inclusion in set of duplicate keywords can be a relative attribute value that a keyword must have relative to attribute values of other keywords in the set of duplicate keywords to which the keyword belongs. For example, the selection criterion can require a duplicate keyword to have a highest attribute value relative to attribute values of the other keywords in the set of duplicate keywords.

Some aspects of the subject matter described can be implemented in a method performed by a data processing device and including the acts receiving sets of duplicate keywords for an advertising account, where each set of duplicate keywords includes keywords having common matching text for the set; presenting a duplicate keyword interface in which the sets of duplicate keywords are displayed, where the duplicate keyword interface includes a duplicate keyword selection interface for requesting selection of keywords from the sets of duplicate keywords based a selection criterion, the selection of duplicate keywords including a duplicate keyword from two or more of the sets of duplicate keywords, each of the duplicate keywords meeting the at least one selection criterion; receiving a selection of keyword selection criteria for selecting duplicate keywords; selecting in each of at least two sets of duplicate keywords a duplicate keyword that satisfies the selection criterion; and enabling modification of attribute values of all of the selected duplicate keywords in response to a single action request. Other implementations of this aspect include corresponding systems, apparatus, and computer program products.

These and other implementations can optionally include one or more of the following features. The common matching text can be the same for each duplicate keyword in each set and different from each other set. Duplicate keywords in a particular set of duplicate keywords can each have a common targeting match type. The method can further include the acts receiving a single action request to modify an attribute of a selected duplicate keyword; and modifying the attribute for each selected duplicate keyword according to the single action request. The selected duplicate keywords can be highlighted.

Other aspects of the subject matter described can be implemented in method including the acts receiving, at a data processing device, sets of duplicate keywords for an advertising account, where each set of duplicate keywords includes keywords that meet a duplication criterion for the set and where the duplication criterion is different for each set; providing to a user device, by a data processing device, duplicate keyword interface instructions that cause the user device to display the sets of duplicate keywords in a duplicate keyword interface, where the duplicate keyword interface includes a duplicate keyword selection input for requesting a selection of keywords from the sets of duplicate keywords based a relative selection criterion that a keyword must satisfy relative to other keywords in its corresponding set of duplicate keywords; receiving, by the data processing device, a request specifying a relative selection criterion for selecting the duplicate keywords; selecting, by the data processing device, in each of at least two sets of duplicate keywords a duplicate keyword satisfies the relative selection criterion; and providing to the user device, by the data processing apparatus, selection data that causes the user device to highlight a duplicate keyword selected in each set.

Particular implementations of the invention can be implemented to realize one or more of the following advantages. Duplicate keywords are selected in a more efficient manner by enabling each duplicate keyword having a specified selection criterion to be selected through a common selection process. Attributes values for the selected duplicate keywords can be adjusted more efficiently by enabling adjustment of the attribute values for each of the selected duplicate keywords in response to a single action request.

The details of one or more implementations are set forth in the accompanying drawings and the description below.

Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

A duplicate keyword selection engine ("selection engine") facilitates identification and selection of duplicate keywords that are associated with advertisements and advertising campaigns. Duplicate keywords can be keywords that meet a duplication criterion. The duplication criterion can require, for example, that a duplicate keyword for a particular set of duplicate keywords each include a set of matching text (i.e., a common n-gram of text).

The selection engine enables advertisers to select a subset of duplicate keywords from one or more sets of duplicate keywords. The selected subset of keywords can be selected based on selection criterion specified by the advertiser. For example, the subset of keywords can be selected based on performance metrics for the keywords, quality measures associated with the keywords, cost measures for the keywords, and other attributes of the keywords.

The selection criterion for selecting keywords for inclusion in a subset of keywords can be a criterion value that a keyword must have relative to other keywords in the set of duplicate keywords to which the keyword belongs. For example, the selection criterion can require a duplicate keyword to have a highest criterion value relative to the other keywords in the set of duplicate keywords. Similarly, the selection criterion can require the duplicate keyword to have a lowest relative criterion value or have a criterion value that is above or below a threshold criterion value.

In some implementations, a selection engine can be implemented as an element of an advertisement management system in an online environment. In other implementations, the selection engine can be implemented in a processing device that communicates over a network with an advertisement management system to adjust settings of an advertising account. The description below describes the selection engine as implemented in an advertiser's processing device. However, the selection engine described below can be implemented and executed in an advertisement management system that is coupled to a processing device through a communications network.

Figure 1:
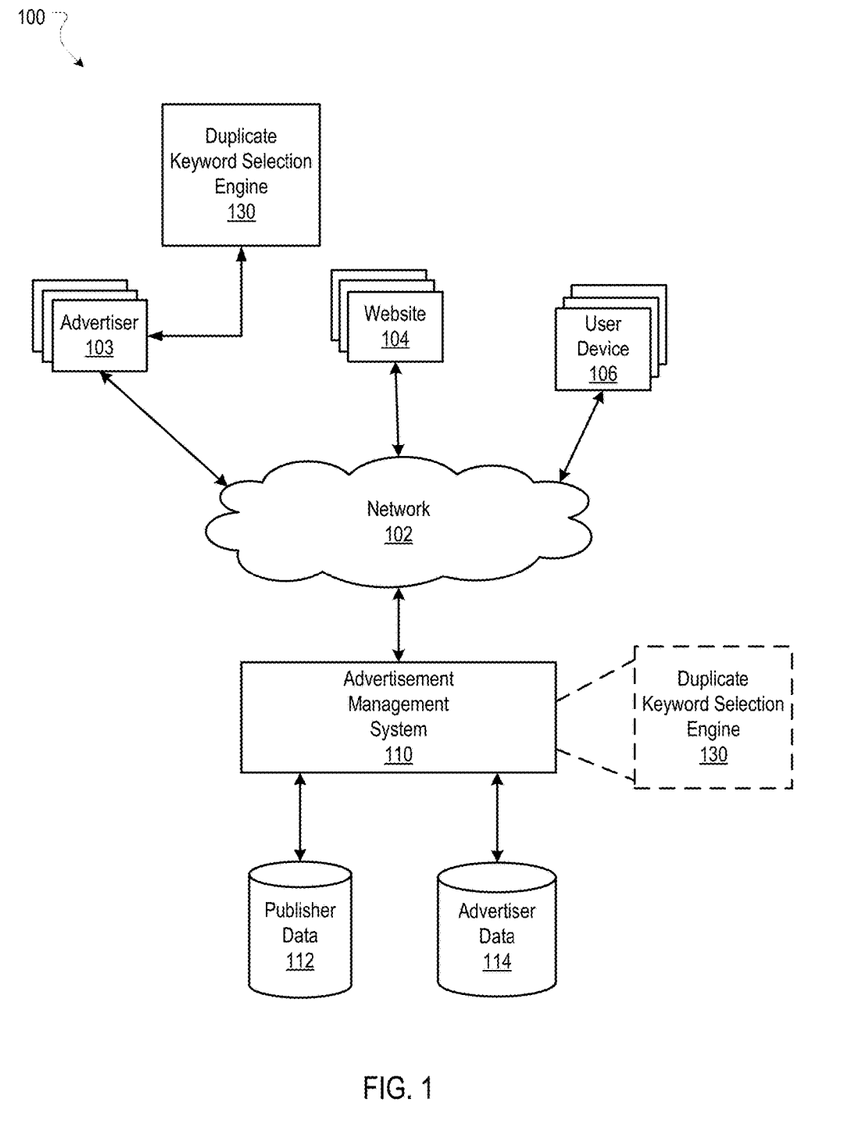
FIG. 1 is a block diagram of an example environment in which an advertisement management system manages advertising services.

FIG. 1 is a block diagram of an example environment 100 in which an advertisement management system 110 manages advertising services. The example environment 100 includes a network 102 such as a local area network (LAN), wide area network (WAN), the Internet, or a combination thereof. The network 102 connects websites 104, user devices 106 and advertisers 103, and the advertisement management system 110. The example environment 100 may include many thousands of websites 104, user devices 106, and advertisers 103.

A website 104 is one or more resources associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that manages and/or owns the website 104.

A resource is any data that can be provided by the website 104 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resource from a website 104. In turn, data representing the resource can be provided to the user device for presentation by the user device 106. The data representing the resource can also include data specifying a portion of the resource or a portion of a user display (e.g., a presentation location of a pop-up window) in which advertisements can be presented. These specified portions of the resource or user display are referred to as advertisement slots.

Characteristics of the advertisements slots can be provided to the advertisement management system 110 to facilitate selection of advertisements for presentation in the advertisement slots. For example, a reference (e.g., URL) to the resource for which the advertisement slot is defined, a size of the advertisement slot, and/or media types that are available for presentation in the advertisement slot can be provided to the advertisement management system 110. In turn, the advertisement management system 110 can select advertisements for presentation in advertisement slots based on the advertisements having characteristics that match the characteristics of the advertisement slot. The characteristics of advertisement slots can be stored, for example, in a publisher data store 112 for access by the advertisement management system 110.

The advertisement management system 110 can also select an advertisement for presentation in an advertisement slot of a resource based on characteristics of the resource matching targeting criteria for the advertisement. Targeting criteria conditions presentation of an advertisement on a resource having characteristics that satisfy the targeting criteria. Targeting criteria can include, for example, targeting keywords, demographic or geographic targeting criteria, or performance-based targeting criteria that each condition presentation of the advertisement. For example, an advertiser can target an advertisement for presentation only when the subject matter for which a resource is identified as relevant matches a targeting keyword associated with the advertisement.

The subject matter for which a resource is relevant can be identified, for example, based on resource keywords associated with the resource. A resource keyword is text that indicates a topic for which the resource is identified as relevant. A publisher of the resource can explicitly associate resource keywords with a resource that are indicative of topics to which the resource is relevant. Additionally, resource keywords can be associated with a resource based on an analysis of the content of the resource. For example, text presented with the resource and anchor text for links to the resource can be used to generate resource keywords for the resource. The resource keywords associated with a resource can be stored, for example, in the publisher data store 112 for access by the advertisement management system 110.

When a resource is requested by a user device 106, the advertisement management system 110 receives a request for advertisements to be provided with the resource. In response to the request, the advertisement management system 110 obtains characteristics of the advertisement slot for the resource as well as resource keywords associated with the resource from the publisher data store 112. Based on the data obtained from the publisher data store 112, the advertisement management system 110 selects advertisements to be provided with the resource. In some implementations, advertisements having targeting keywords that match the resource keywords are selected by the advertisement management system 110 to be provided with the resource.

Advertisers can provide targeting keywords for an advertisement, or the targeting keywords can be generated for the advertisement by the advertisement management system 110. The advertisement management system 110 can generate keywords for the advertisement, for example, based on keyword suggestion processes (e.g., clustering techniques). For example, an advertiser can provide a relevant term for its advertisement and the advertisement management system can provide a list of suggested keywords to associate with the advertisement. In some implementations, the suggested keywords can automatically be associated with the advertisement. In other implementations, the advertiser can select suggested keywords to associate with the advertisement.

Because there are various ways in which targeting keywords can be associated with advertisements, duplicate key words may be associated with advertisements for an advertiser. These duplicate keywords can complicate advertising account management as the number of advertisements in the advertising account increases. For example, as the number of advertisements in an advertising campaign (or the account as a whole) increases and/or the number of keywords associated with advertisements in an advertising campaign increases, different advertisements may be associated with the same keyword.

Some of the advertisements that are associated with a particular keyword may have a higher performance when selected for presentation based on the particular keyword than other advertisements that are associated with the keyword. Thus, an advertiser may want to change targeting criteria and/or a price that the advertiser is willing to pay for advertisements associated with the particular keyword, for example, based on the performance of the advertisements when selected for presentation based on the particular keyword. However, it can become time consuming for an advertiser to manually identify and select advertisements having duplicate keywords as the number of advertisements in an advertising campaign increases. Similarly, it can also be time consuming to make changes to each individual advertisement that is associated with a particular keyword.

In some implementations, an advertiser 103 can use a selection engine 130 to identify and select duplicate keywords in an advertisement management account. The selection engine 130 can be an independent system that is accessible over the network 102 by a processing device being used, for example, by the advertiser 103 or implemented as a component of a processing device being used by the advertiser 103.

The selection engine 130 receives a request from an advertiser to present sets of duplicate keywords for the advertiser's account. In response, the selection engine 130 obtains advertising account data including data identifying the keywords that are associated with each of the advertiser's advertisements.

Sets of duplicate keywords are identified based on the advertising account data by identifying keywords having common matching text, as described below with reference to FIG. 2. The sets of duplicate keywords are presented to the advertiser in a user interface, as described with reference to FIG. 3. The user interface includes a duplicate keyword selection interface that enables the advertiser to request selection of duplicate keywords and specify relative selection criterion by which keywords are to be selected from the sets of duplicate keywords. The selection engine 130 selects keywords that satisfy the selection criterion and presents an indication of the selection, for example, by highlighting the keywords that satisfy the selection criterion. The selection engine 130 then enables modification of attribute values for all of the selected keywords though a single action request from the advertiser. An action request is a request to take action with respect to the advertiser's account. Example action requests include requests to change a cost-per-click bid for an advertisement, a status of the keyword (i.e., active or deleted), a match type for the keyword or other attribute values for the keyword.

Data specifying the modification to the selected keywords is provided to the advertisement management system 110. In turn, the advertisement management system 110 selects advertisements for presentation with resources based on the modified attribute values for the selected keywords.

For example, when the cost-per-click bid for the selected keywords is modified, the advertisements that are associated with the selected keywords will be selected for presentation based on the selected keywords according to the new cost-per-click bid for the keyword. When the bid is increased, the advertisements may be selected for presentation more often than prior to the modification because the modified bid is higher than the bids for other advertisements competing for the advertisement slot. In contrast, if the bid is decreased, the advertisements may be selected for presentation less often than prior to the modification because other advertisements having higher bids are selected for presentation. Thus, modifying the attribute values of the selected keywords can affect the advertisements that are selected for presentation by the advertisement management system, such that different advertisements are selected for presentation with a particular resources following modification of the attribute values.

The duplicate keyword selection interface, selection of duplicate keywords by the selection engine 130 and modification of selected keywords are described in more detail with reference to FIGS. 2-4.

Figure 2:
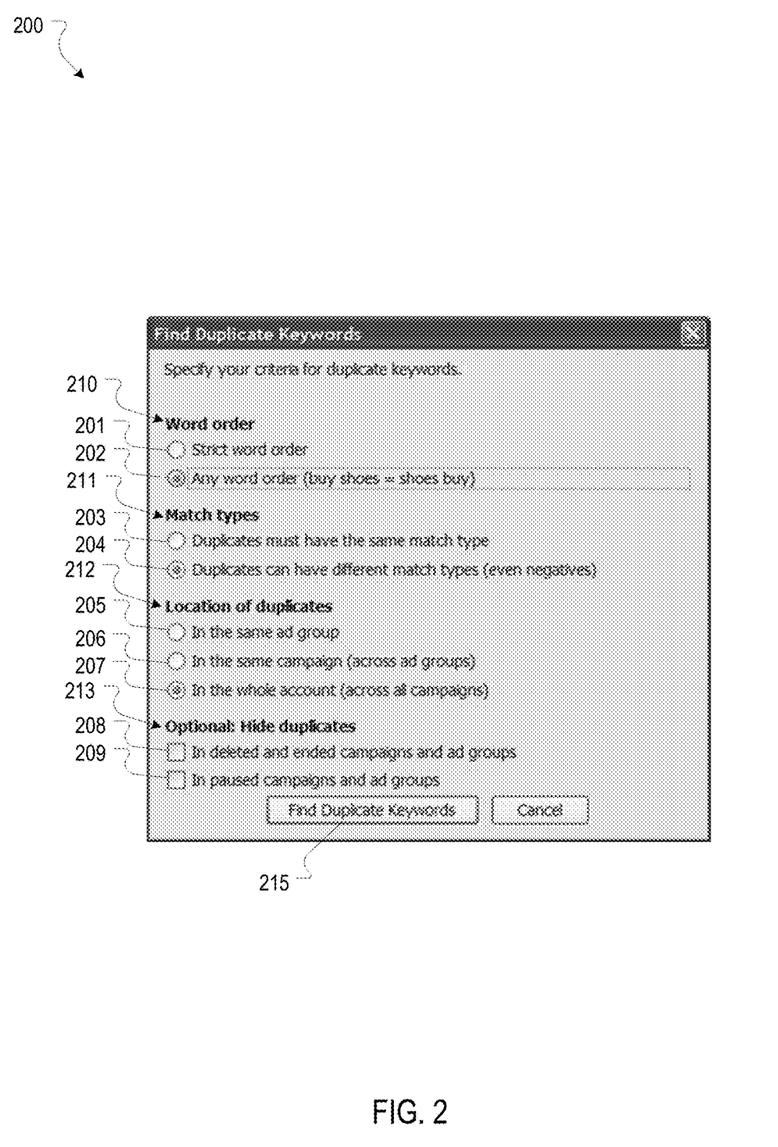
FIG. 2 is an illustration of a user interface with which an advertiser can request identification and presentation of duplicate keywords.

FIG. 2 is an illustration of a user interface 200 with which an advertiser can request identification and presentation of duplicate keywords. The user interface 200 includes selectable radio buttons 201-209 with which an advertiser can specify identification criteria 210-213 for duplicate keywords to be selected for presentation. Identification criteria are criteria by which duplicate keywords are selected for presentation in a duplicate keyword interface.

In some implementations, an advertiser can select radio buttons 201 or 202 to specify a word order criterion 210. The word order criterion 210 is an identification criterion that specifies whether duplicate keywords are required to have the same word order, or if keywords having the same words in different orders are duplicate keywords. For example, when the keyword "ice cream" is to be identified as a duplicate keyword for the keyword "cream ice," radio button 202 can be selected to specify that these keywords are to be selected for presentation as duplicate keywords. In contrast, radio button 201 can be selected to when these keywords are not to be selected for presentation as duplicate keywords.

The advertiser can also specify whether duplicate keywords are required to have a common targeting match type to be identified as duplicate keywords. A targeting match type is a characteristic of a targeting keyword that specifies a scope of resource keywords or search queries that match the targeting keyword. For example, when a broad targeting match type is specified, the targeting keyword "tennis shoes" can be satisfied by any of the resource keywords (or search queries) "tennis," "shoes," or "tennis shoes." However, if an exact match type is specified, the targeting keyword "tennis shoes" can only be satisfied by the resource keyword (or search query) "tennis shoes."

In some implementations, the advertiser specifies that keywords are required to have a common targeting match type by selecting radio button 203. When radio button 203 is selected, only keywords having the same match type are identified as duplicate keywords and selected for presentation in a common set of duplicate keywords. However, when the advertiser specifies that duplicate keywords are not required to have the same match type, for example, by selecting radio button 204, duplicate keywords are identified and selected for presentation irrespective of the targeting match types for the keywords.

The user interface 200 also enables an advertiser to specify a location criterion 212 for presenting keywords as a set of duplicate keywords. The location criterion 212 is an identification criterion that specifies a portion of an advertiser's account with which keywords must be associated for the keywords to be included in a common set of duplicate keywords. For example, the advertiser can specify that a set of duplicate keywords can only include keywords that are associated with advertisements in a common ad group by selecting radio button 205.

An ad group, as used throughout this document, is one or more advertisements that are grouped for targeting to a common resource or set of keywords. For example, two advertisements can belong to an ad group that is targeted to a particular webpage or domain. In this example, keywords associated with the two advertisements that are targeted to the particular webpage or domain are eligible to be grouped together in a common set of duplicate keywords because the two advertisements with which the keywords are associated are members of a common ad group.

The user interface 200 also enables an advertiser to select radio button 206 to specify that a set of duplicate keywords can only include keywords that are associated with a common advertising campaign. An advertising campaign, as used throughout this document, is a set of advertisements or ad groups that have a common set of distribution parameters. Distribution parameters specify criteria by which a set of advertisements are distributed. The distribution parameters can include, for example, an advertising budget for a set of advertisements, geographic targeting criteria for the set of advertisements, language based targeting criteria or other distribution preferences (e.g., start dates and end dates) for the set of advertisements.

The user interface 200 further enables an advertiser to specify that any keyword associated with any advertisement in the advertiser's campaign is eligible for inclusion in a set of duplicate keywords. For example, when radio button 207 is selected by an advertiser, the selection engine 130 will identify keywords for inclusion in a set of duplicate keywords irrespective of the ad group or campaign to which the keyword corresponds as long as the keywords are associated with an advertisement in the advertiser's account.

In some implementations, the user interface 200 can enable selection of a status criterion 213. The status criterion 213 is an identification criterion that conditions presentation of a keyword in a set of duplicate keywords based on the status of the advertisement, ad group, or campaign with which the keyword is associated. For example, check box 208 can be selected to specify that only keywords associated with advertisements in ad groups or campaigns that have not ended and have not been deleted are eligible for inclusion in sets of duplicate keywords.

Similarly, check box 209 can be selected to specify that only keywords associated with advertisements that are in ad groups or campaigns that have not been paused are eligible for inclusion in sets of duplicate keywords. The status criteria associated with check boxes 208 and 209 are not mutually exclusive criteria. Therefore, an advertiser can select check boxes 208 and 209 to specify that keywords associated with advertisements in deleted, ended or paused campaigns or ad groups are not eligible to be included in a set of duplicate keywords.

Once identification criteria for duplicate keywords have been selected using, for example, the user interface 200, the selections can be submitted in response to a selection of a submission button 215. The submission button 215 can execute a script or another processing routine that provides data representing the selected identification criteria to the selection engine 130. In turn, the selection engine 130 accesses the keywords associated with the advertiser's account and identifies sets of duplicate keywords for presentation to the advertiser based on the data representing the identification criteria.

Referring again to FIG. 1, in some implementations, the selection engine 130 can provide a request for targeting keywords to the advertisement management system 110 and receive keywords that are stored in an advertiser data store 114 storing advertising account data for an advertiser's account. The advertiser data store 114 can be implemented in digital memory directly connected to a processing device or a digital memory that is accessible by the processing device over the network 102.

The selection engine 130 identifies sets of duplicate keywords by comparing text of keywords to identify keywords that have the same text. When presentation conditions have not been specified, the selection engine 130 groups each keyword having common matching text into a set of duplicate keywords and presents each unique set of duplicate keywords to the advertiser. Each unique set of duplicate keywords is a set of keywords in which each keyword has common matching text that is different from the common matching text for other sets of duplicate keywords.

Common matching text is text in two or more keywords that satisfies minimum specified similarities. The minimum specified similarities can require that common matching text be text that includes all of the same characters such that only two instances of the same word(s) are considered common matching text. The minimum specified similarities can alternatively require that two words only include a common string of characters (e.g., an n-gram) to be considered common matching text. For example, a singular version of a word (e.g., cat) can be identified as having common matching text with a plural version of the word (e.g., cats). Similarly, keywords can be identified as having common matching text when each keyword includes a common word (e.g., "sports car" and "red car").

In some implementations, the minimum specified similarities that common matching text must satisfy can require that the two words belonging to a common cluster of words, or clusters that are within a specified distance (e.g., cosine similarity measure) of each other, irrespective of a common string of characters being included in the words. Data specifying clusters of words that are identified as relevant to each other (e.g., synonyms or related to a common topic) can be received from clustering systems that cluster terms based, for example, on the terms being associated with common resources. In turn, the selection engine can determine whether two keywords are members of a common cluster (or clusters that are within a specified distance) and determine whether the keywords are identified as having common matching text.

In some implementations, when identification criteria have been specified, the selection engine 130 compares characteristics of the keywords with the identification criteria to determine whether the keywords are eligible for presentation and/or inclusion in a set of duplicate keywords. Keywords that are eligible for presentation, for example, based on the characteristics of the keywords satisfying the identification criteria are grouped into sets of duplicate keywords with other keywords having common matching text. The selection engine 130 provides duplicate keyword interface instructions to an advertiser's processing device that cause the advertiser's processing device to display the sets of duplicate keywords in a duplicate keyword interface.

Figure 3:
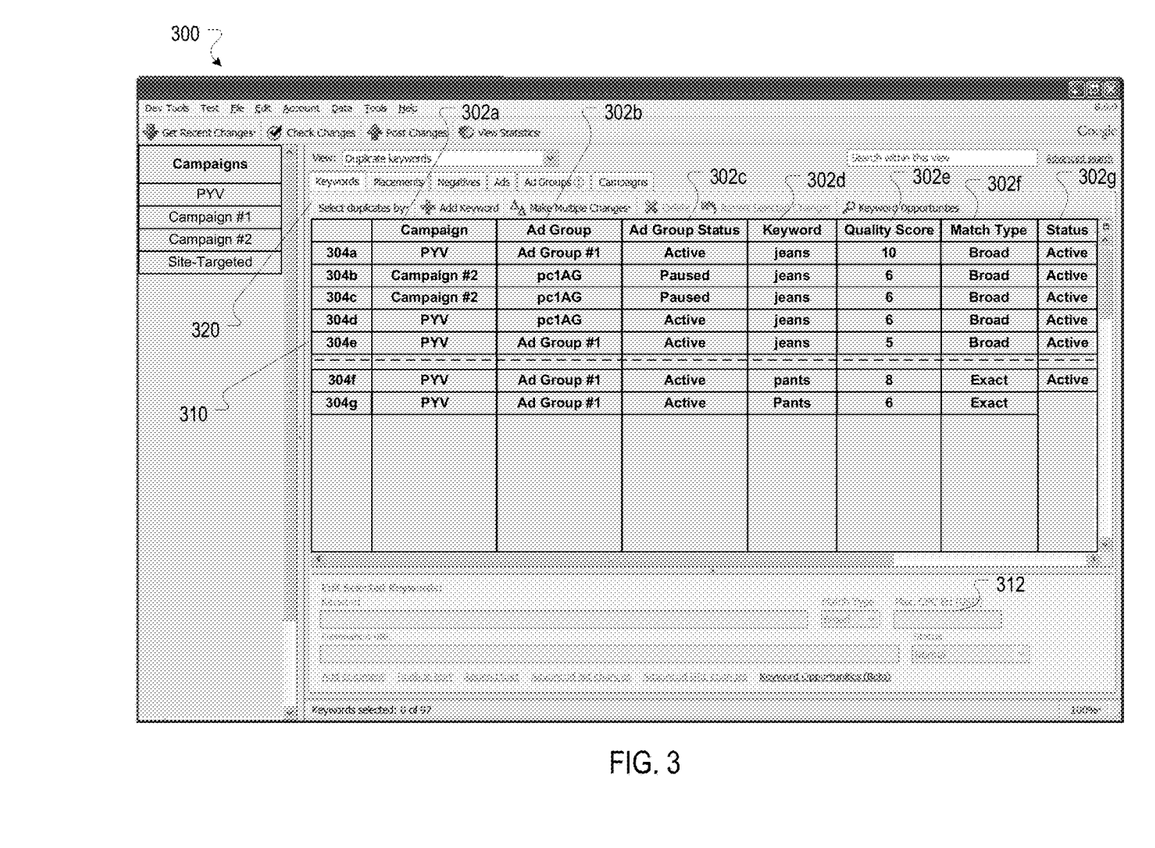
FIG. 3 is an illustration of an example duplicate keyword interface in which sets of duplicate keywords are presented.

FIG. 3 is an illustration of an example duplicate keyword interface 300 in which sets of duplicate keywords are presented. The duplicate keyword interface 300 can be defined, for example, by the keyword interface instructions provided by the selection engine 130. The duplicate keyword interface 300 can be presented by a processing device that receives the instructions. In some implementations, the processing device in which the selection engine 130 is implemented is the same processing device that presents the duplicate keyword interface 300 (e.g., a client device).

In some implementations, the duplicate keyword interface 300 can include columns 302a-302h corresponding to attributes of keywords associated with an advertiser's advertisements. The duplicate keyword interface 300 can also include rows 304 in which attribute values corresponding to the attributes can be presented. Each row corresponds to a duplicate keyword. For example, the text of each keyword can be presented in column 302d, labeled "Keyword." The text of each keyword is presented in a cell that is defined by the intersection of column 302d and the row corresponding to the keyword. For example, the text "jeans" that is a keyword associated with the campaign titled "Campaign #2" and the ad group titled "pc1AG" is presented in a cell defined by the intersection of column 302d and row 304b. Other characteristics of this keyword are presented in cells defined by the intersection of other columns (i.e., 302a-302c and 302e-302g) and row 304b.

Duplicate keywords in a common set of duplicate keywords can have corresponding attributes values presented in adjacent rows. For example, data for the set of duplicate keywords corresponding to the keyword "jeans" are presented in rows 304a-304e, while data for the set of duplicate keywords corresponding to the keyword "pants" are presented in rows 304f-304g.

In some implementations, sets of duplicate keywords can be visually delineated so that adjacent groups of duplicate keywords are more easily identified. For example, the dashed line 310 delineates sets of duplicate keywords in the example duplicate keyword interface 300. The sets of duplicate keywords can also be visually delineated using unique color backgrounds for adjacent sets of duplicate keywords. For example, one set of duplicate keywords can have a grey background, while a second set of duplicate keywords that are presented adjacent to the first set may have a yellow background.

Once sets of duplicate keywords are presented to an advertiser in the duplicate keyword interface 300, the advertiser may want to change attributes values for some of the keywords. For example, the advertiser may want to adjust a maximum cost-per-click bid (i.e., the maximum price the advertiser is willing to pay for each click of an advertisement served based on a particular keyword) for keywords in each set of duplicate keywords that have low performance metrics relative to other keywords in the set of duplicate keywords. To make the adjustment, each duplicate keyword can individually selected and the desired change by can be made by selecting a button or entering data into an input field corresponding to the desired change. For example, an advertiser can change the maximum cost-per-click bid for a keyword by selecting the keyword and entering the new cost-per-click bid in the input field 312 labeled "Max. CPC Bid." In turn, the new cost-per-click-bid is provided to the advertisement management system that is managing the advertiser's account.

An advertiser can manually select each individual keyword for which the advertiser desires to make changes. However, as the number of keywords in the advertiser's account increases, the time required to make individual changes also increases. The time required to make changes to the keywords can be reduced by enabling the advertiser to select a group of keywords to adjust in response to a single action request.

In some implementations, the duplicate keyword interface 300 can facilitate selection of duplicate keywords from each of the sets of duplicate keywords based on keyword selection criteria provided by the advertiser. The keyword selection criteria are criteria that a keyword must satisfy to be selected. The keyword selection criteria can include criterion that are measured relative to other keywords in a set of duplicate keywords.

For example, the keyword selection criteria can specify that only the keyword having a highest click-through-rate (i.e., # of clicks/# of presentations) among the all of the keywords in a set of duplicate keywords be selected. Similarly, the keyword selection criteria can specify that only the keyword having a lowest click-through-rate among all of the keywords in a set of duplicate keywords be selected. The relative selection criteria by which keywords can be selected are described in more detail below.

In some implementations, the duplicate keyword interface facilitates selection of duplicate keywords from each of the sets of duplicate keywords by providing a duplicate keyword selection interface. The duplicate keyword selection interface can be accessed, for example, by selecting a keyword selection button 320 that is defined in the duplicate keyword interface 300. In response to selection of the keyword selection button 320, a duplicate keyword selection interface can be presented that enables an advertiser to provide keyword selection criteria. The duplicate keyword selection interface can also be accessed through a drop-down menu, a pop-up window, or other user interfaces that enable input or selection of data.

Figure 4:
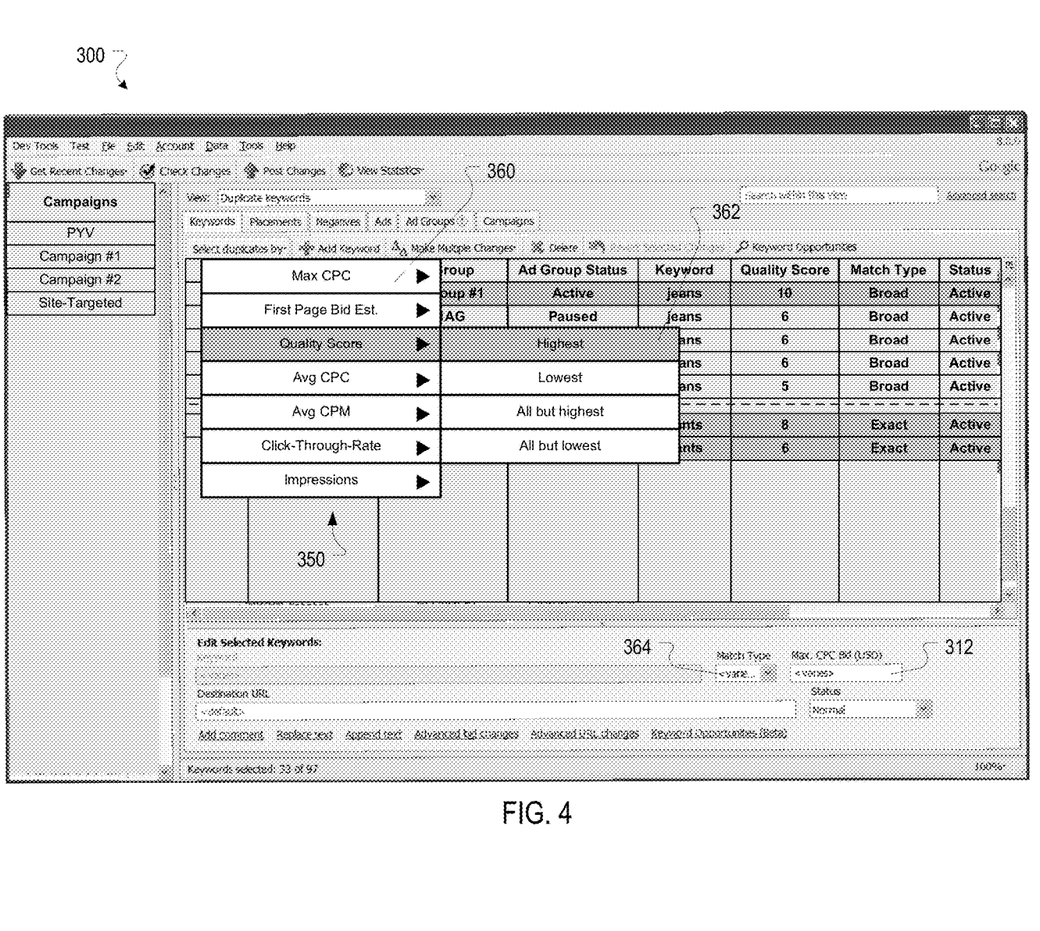
FIG. 4 is an illustration of the duplicate keyword interface in which a keyword selection interface is presented.

FIG. 4 is an illustration of the duplicate keyword interface 300 in which a keyword selection interface 350 is presented. The keyword selection interface 350 includes a set of selection criteria categories 360 by which keywords can be selected. In response to selection of a selection criteria category, the selection engine 130 receives the selection and provides instructions to the advertiser's processing device that causes presentation of relative criteria 362 corresponding to the selected criterion category.

For example, the selection engine 130 can receive data representing an advertiser's selection of the criterion category "quality score" indicating that the advertiser wants to select keywords based on their quality score. A quality score is a measure of quality for the keyword based, for example, on the performance of advertisements associated with the keyword relative to the performance of advertisements associated with other keywords that have been presented with the same resources. When an advertiser selects the "quality score" category, the selection engine 130 provides instructions that cause the advertiser's processing device to present relative criteria 362 corresponding to the "quality score" category.

The advertiser can select the relative criteria that characterize keywords that the advertiser wants to select. For example, the advertiser can select the relative criterion "highest" to select the keyword from each set of duplicate keywords that has the highest quality score relative to all of the keywords in the set. Similarly, the advertiser can select the relative criteria, "lowest," "all but lowest," or "all but highest" to respectively select keywords having the lowest quality score, all keywords in each a set except the keyword in each set having the lowest quality score, or all keywords in each set except the keyword in each set having the highest quality score.

The selection engine 130 receives data corresponding to the advertiser's selection of a relative criterion 362 and identifies a duplicate keyword each set of duplicate keywords that satisfies the selected relative criterion. For example, the selection engine 130 can compare attribute values corresponding to the selected category for each keyword in a set of duplicate keywords to identify the keyword in each set of duplicate keywords that satisfy the selected relative criterion.

Once the selection engine 130 identifies a selected keyword in each of the sets of duplicate keywords that satisfy the selection criterion, the selection engine 130 provides instructions that cause the advertiser's processing device to indicate selection of the keywords. In some implementations, the instructions can cause the selected keywords to be presented in a manner that visually highlights the selected keywords. In other implementations, the instructions can cause the sets of duplicate keywords to be filtered such that only the selected keywords are presented in the duplicate keyword interface 300.

The selection engine 130 also enables modification of the selected keywords in response to a single action request. For example, the selection engine 130 can provide instructions to the advertiser's processing device that enables the advertiser to adjust attribute values for each of the selected keywords by selecting a button or entering data into an input field corresponding to the desired change. For example, the advertiser can change the maximum cost-per-click bid for each selected keyword by entering the new cost-per-click bid in the input field 312 labeled "Max. CPC Bid." In turn, data representing the new cost-per-click-bid is provided to the advertisement management system managing the advertiser's account and the cost-per-click bid is adjusted for each of the selected keywords in response to the single request to change the cost-per-click bids.

Other keyword attributes for the selected keywords can be adjusted in response to additional action requests. For example, after a request to adjust the cost-per-click bids for the selected advertisements is received, the advertiser can change the match type for each of the selected keywords by selecting the "Match Type" drop-down menu 364 and selecting the desired targeting match type for the selected keywords. The selection engine 130 receives data representing the action request to set the match type of the selected keywords and adjusts the match types of the selected keywords according to the selected match type. Thus, the targeting match type for each selected keyword is set in response to the single request to change the target match type.

Duplicate keywords can also be selected based on a "first page bid estimate" that represents an estimated bid required for an advertisement associated with the keyword to be presented on the first page of search results that are provided to a user in response to a search query. Duplicate keywords can additionally be selected based on grammatical characteristics (e.g., capitalization) of the keywords.

Several actions are described above for adjusting attributes of targeting keywords. However, action requests can be received for adjusting any attribute associated with the selected keywords or to define new attributes for the selected keywords. Additionally, several example selection criteria are described above for selecting duplicate keywords. However, duplicate keywords can be selected based on any criteria for which data is available for the keywords. For example, keywords can be selected based on additional performance metrics of advertisements associated with the keyword including an average cost-per-click (CPC) for the advertisements, an average cost-per-thousand impressions (CPM) (i.e., average cost for 1,000 presentations) of the advertisements, a click-through-rate (CTR) for the advertisements, a total number of presentations (impressions) of the advertisements among other performance metrics.

Figure 5:
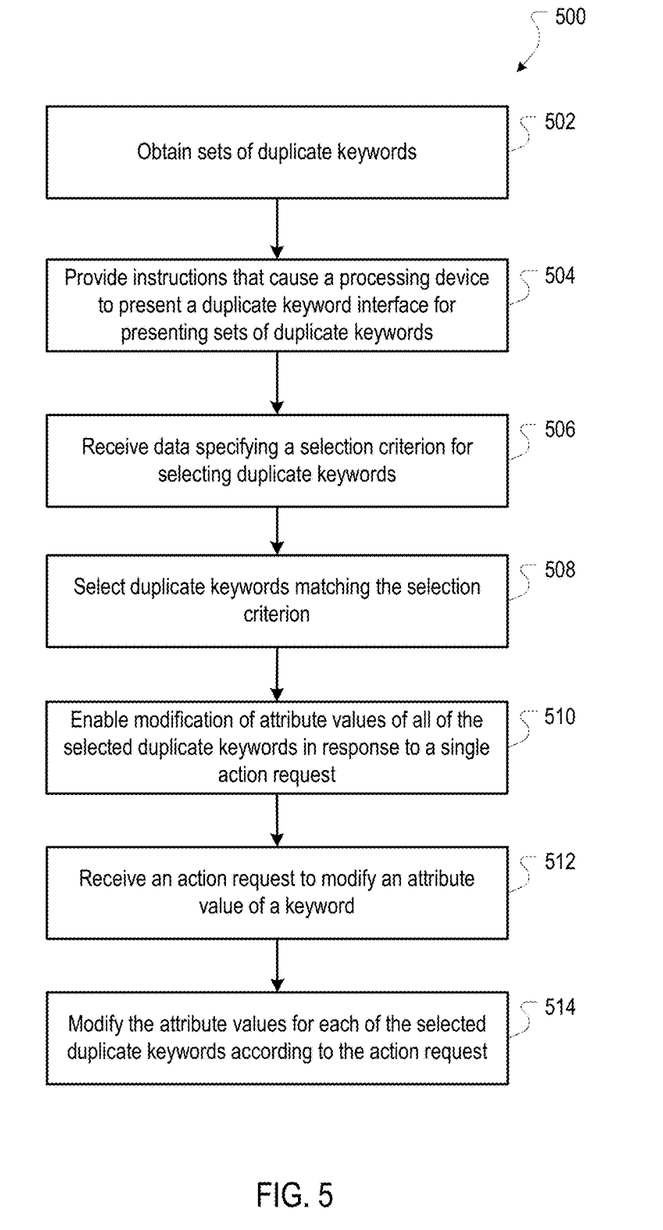
FIG. 5 is a flow chart of an example process for selecting duplicate keywords.

FIG. 5 is a flow chart of an example process 500 for selecting duplicate keywords. The process 500 can be implemented, for example, by the selection engine 130 of FIG. 1. In some implementations, the selection engine 130 includes one or more processors that are configured to perform operations of the process 500. In other implementations, a computer readable medium can include instructions that when executed by a computer cause the computer to perform operations of the process 500. The process 500 can be implemented for example in a server-client environment where the selection engine 130 receives requests for data and action requests from a client device. In response to the requests, the selection engine 130 performs processing steps and provides, to a client device, responses to the requests.

Sets of duplicate keywords are obtained (502). In some implementations, each of the sets of duplicate keywords includes keywords that each includes common matching text. Each set of duplicate keywords can be a set of keywords that include only the common matching text or a set of keywords that include the common matching text and additional text. For example, a first set of duplicate keywords that only include instances of the text "jeans" is a set of keywords that include only the common matching text, while a second set of keywords that include the text "red ball," "blue ball," and "green ball" may be a set of duplicate keywords including the common matching text "ball," and also include additional text. The sets of duplicate keywords can be obtained, for example, from an advertisement management system and/or a data store that stores keywords that are associated with advertisements, advertising campaigns, and/or advertising accounts.

Duplicate keyword interface instructions that cause a processing device to present a duplicate keyword interface for presenting sets of duplicate keywords are provided (504). In some implementations, the duplicate keyword interface includes a keyword selection interface for receiving a request for selection of duplicate keywords. In some implementations, the request for selection of duplicate keywords is a request that duplicate keywords from at least two sets of duplicate keywords be selected based on received selection criteria.

The duplicate keyword interface instructions can include instructions that cause the processing device to present each keyword in a particular set of duplicate keywords at presentation locations that are adjacent to other keywords in the particular set of duplicate keywords. The duplicate keyword interface instructions can further include instructions that cause the processing device to visually delineate sets of duplicate keywords, as described above, with reference to FIG. 3.

Data specifying selection criterion for selecting duplicate keywords are received (506). In some implementations, the selection criterion can include a selection criteria category and a corresponding relative criteria for selecting duplicate keywords, as described above with reference to FIG. 4. For example, the data can specify that the keyword selected from each set of duplicate keywords must have a highest or lowest performance metric or quality metric relative to other keywords in the set of duplicate keywords.

Duplicate keywords matching the selection criterion are selected (508). In some implementations, for each keyword in a set of duplicate keywords, attribute values of keyword attributes corresponding to the selected category are compared to identify one or more keywords that satisfy the selection criteria. For example, when the selection criterion specifies selection of each keyword in a set of duplicate keywords except for the keyword associated with a highest relative criterion value, the attribute values for each keyword in the set can be compared to identify the keyword having the highest attribute value that corresponds to the criterion. In turn, every keyword in the set of duplicate keywords is selected except for the keyword having the highest attribute value.

In some implementations, instructions are provided that cause a processing device to visually indicate the keywords that have been selected from each set of duplicate keywords. For example, instructions can be provided that cause the processing device to highlight the selected keywords in each set of duplicate keywords.

Modification of attribute values of all of the selected duplicate keywords in response to a single action request is enabled (510). In some implementations, the single action requests can be requests to adjust attribute values of the keywords. For example, a single action request can be a request to adjust a cost-per-click bid associated with a keyword. Other single action requests can include requests to change a targeting match type for a keyword, and change a status (e.g., active or deleted) of a keyword. The modification of selected keywords can be enabled, for example, by providing instructions that cause a processing device to present or activate text boxes, interactive buttons and/or drop-down menus for receiving action requests in the duplicate keyword interface.

An action request to modify an attribute of a keyword is received (512). In some implementations, the action request is received in response to a selection of an action from a drop-down menu, selection of an interactive button corresponding to the action, or data indicative of the requested action input to a text box. The action request can be specified by data generated by a processing device in response to the selection. The action request can specify the attribute to be modified and a value for the attribute. For example, the action request can specify that the maximum cost-per-click bid for a keyword be set to $2.00/click.

The attribute values specified by the action request are modified for each of the selected keywords according to the action request (514). In some implementations, the attribute is modified to set a value for the attribute equal to the value specified by the action request. For example, when the action request specifies that the maximum cost-per-click bid for a keyword be set to $2.00/click, the cost-per-click attribute for each of the selected keywords is set to $2.00/click in response to the action request.

Figure 6:
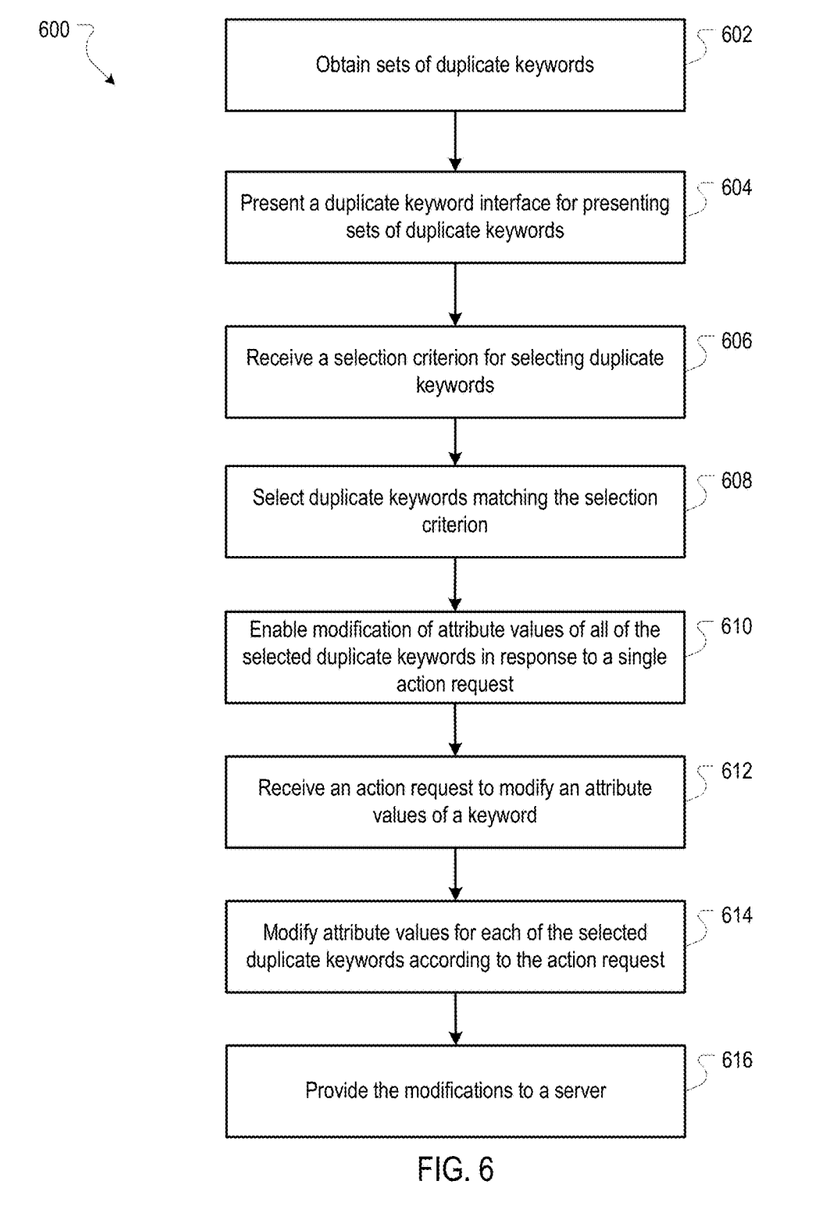
FIG. 6 is a flow chart of another example process for selecting duplicate keywords.

FIG. 6 is a flow chart of another example process 600 for selecting duplicate keywords. The process 600 can be implemented, for example, by a processing device in which the selection engine 130 of FIG. 1 is implemented. In some implementations, the processing device in which the selection engine 130 is implemented includes one or more processors that are configured to perform operations of the process 600. In other implementations, a computer readable medium can include instructions that when executed by the processing device to perform operations of the process 600. The process 600 can be implemented in a client device that receives or downloads data necessary to perform the process 600.

Sets of duplicate keywords are obtained (602). In some implementations, each of the sets of duplicate keywords are keywords that each includes common matching text. Each set of duplicate keywords can be a set of keywords that include only the common matching text or a set of keywords that include the common matching text and additional text. For example, a first set of duplicate keywords that only include instances of the text "jeans" is a set of keywords that include only the common matching text, while a second set of keywords that include the text "red ball," "blue ball," and "green ball" may be a set of duplicate keywords including the common matching text "ball," and also include additional text. The sets of duplicate keywords can be obtained, for example, from an advertisement management system and/or a data store that stores keywords that are associated with advertisements, advertising campaigns, and/or advertising accounts. The sets of duplicate keywords can be stored in digital memory for the processing device.

A duplicate keyword interface for presenting sets of duplicate keywords is presented by the processing device (604). In some implementations, the duplicate keyword interface includes a keyword selection interface for receiving a request for selection of duplicate keywords. In some implementations, the request for selection of duplicate keywords is a request that duplicate keywords from at least two sets of duplicate keywords be selected based on received selection criteria.

The duplicate keyword interface can present each keyword in a particular set of duplicate keywords at presentation locations that are adjacent to other keywords in the particular set of duplicate keywords. The duplicate keyword interface can present the duplicate keywords in a manner that visually delineates sets of duplicate keywords, as described above, with reference to FIG. 3.

Selection criterion for selecting duplicate keywords is received (606). In some implementations, the selection criterion can include a selection criteria category and a corresponding relative criteria for selecting duplicate keywords, as described above with reference to FIG. 4. The selection criterion can be received in response to the selection criterion being selected from the keyword selection interface.

Duplicate keywords matching the selection criterion are selected (608). In some implementations, for each keyword in a set of duplicate keywords, attribute values of keyword attributes corresponding to the selected category are compared to identify one or more keywords that satisfy the selection criteria.

For example, when the selection criterion specifies selection of each keyword in a set of duplicate keywords except for the keyword associated with a highest relative criterion value, the attribute values for each keyword in the set can be compared to identify the keyword having the highest attribute value that corresponds to the criterion. In turn, every keyword in the set of duplicate keywords is selected except for the keyword having the highest attribute value.

In some implementations, the keywords that have been selected from each set of duplicate keywords can be presented in a manner that highlights the selected keywords in each set of duplicate keywords.

Modification of attribute values of all of the selected duplicate keywords in response to a single action request is enabled (610). In some implementations, the single action requests can be requests to adjust attribute values of the keywords. For example, a single action request can be a request to adjust a cost-per-click bid associated with a keyword. Other single action requests can include requests to change a targeting match type for a keyword, and change a status (e.g., active or deleted) of a keyword. The modification of selected keywords can be enabled, for example, by presenting or activating text boxes, interactive buttons and/or drop-down menus for receiving action requests in the duplicate keyword interface.

An action request to modify an attribute value of a keyword is received (612). In some implementations, the action request is received in response to a selection of an action from a drop-down menu, selection of an interactive button corresponding to the action, or data indicative of the requested action input to a text box. The action request can specify the attribute to be modified and a value for the attribute. For example, the action request can specify that the maximum cost-per-click bid for a keyword be set to $2.00/click.

The attribute values specified by the action request are modified for each of the selected keywords according to the action request (614). In some implementations, the attribute is modified to set a value for the attribute equal to the value specified by the action request. For example, when the action request specifies that the maximum cost-per-click bid for a keyword be set to $2.00/click, the cost-per-click attribute for each of the selected keywords is set to $2.00/click in response to the action request.

The modifications to the attribute values are provided to a server (616). In some implementations, the modifications are provided to an advertisement management system that manages advertisements associated with the keywords. In other implementations, the modifications are uploaded to an independent server that can provide the modifications upon request.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving sets of duplicate keywords for an advertising account, each set of duplicate keywords including keywords having common matching text for the set, each of the duplicate keywords corresponding to an advertisement for the advertising account;
   presenting, by a data processing device, a duplicate keyword interface in which the sets of duplicate keywords are displayed, the duplicate keyword interface including a duplicate keyword selection interface for requesting selection of keywords from the sets of duplicate keywords based on a selection criterion;

receiving, by the data processing device and through the duplicate keyword interface, a keyword selection criterion for selecting duplicate keywords;

identifying, by the data processing device and based on the received keyword selection criterion, at least two different sets of duplicate keywords that each include a duplicate keyword that satisfies the selection criterion;

receiving a single action request to modify an attribute value of duplicate keywords in the at least two different sets of duplicate keywords that satisfy the selection criterion; and modifying, within each particular set of the at least two different sets of duplicate keywords, the attribute value for a proper subset of the duplicate keywords in the particular set, the proper subset being only those duplicate keywords in the particular set that satisfy the selection criterion, the modification being performed in response to the single action request.

2. The method of claim 1, wherein each set of duplicate keywords includes at least two duplicate keywords that correspond to at least two different advertisements in a common advertising campaign for the advertising account.

3. The method of claim 1, wherein receiving the sets of duplicate keywords, comprises receiving sets of duplicate keywords in which the common matching text is an exact same set of characters for each duplicate keyword in each set, and the common matching text for each set is different from each other set.

4. The method of claim 1, wherein receiving the sets of duplicate keywords comprises receiving sets of duplicate keywords in which each duplicate keyword has a common targeting match type in each set, and the common targeting match type is different from each other set.

5. The method of claim 1, wherein the single action request comprises a request to change a bid for a keyword.

6. The method of claim 1, wherein the single action request comprises a request to change a targeting match type for a keyword.

7. The method of claim 1, wherein the single action request comprises a request to delete a keyword.

8. The method of claim 1, wherein presenting a duplicate keyword interface comprises providing a duplicate keyword interface in which at least one attribute value of each keyword in the sets of duplicate keywords is displayed and wherein the at least one attribute value includes an attribute value for an attribute selected from a group consisting of a quality score, a keyword word count, a targeting match type, an advertisement group to which each keyword belongs, a status of each keyword specifying whether the keyword is active or paused, a status of the advertisement group, and a campaign to which each keyword belongs.

9. The method of claim 1, wherein selecting in each of at least two sets of duplicate keywords a duplicate keyword that satisfies the selection criterion comprises highlighting selected duplicate keywords to indicate the selection.

10. The method of claim 1, wherein receiving a selection of keyword selection criteria comprises receiving a selection of a relative criteria for selecting duplicate keywords having an attribute value relative to attribute values of other keywords in a common set of duplicate keywords that satisfies the relative criteria.

11. The method of claim 1, further comprising providing data representing the modified attribute value to an advertisement server.

12. The method of claim 11, further comprising:
receiving, by the server, a request for an advertisement for presentation with a resource; and
selecting an advertisement corresponding to the advertising account, for presentation with the resource based on the modified attribute value.

13. The method of claim 12, wherein the selected advertisement is a different advertisement than another advertisement that was selected for presentation with the resource prior to modification of the attribute value.

14. The method of claim 13, wherein the selected advertisement is selected in response to the modified attribute value being a modified bid for advertisements corresponding to the duplicate keyword.

15. A computer-implemented method, comprising:
receiving, at a data processing device, sets of duplicate keywords for an advertising account, each set of duplicate keywords including keywords that meet a duplication criterion for the set, the duplication criterion being different for each set;

providing to a user device, by a data processing device, duplicate keyword interface instructions that cause the user device to display the sets of duplicate keywords in a duplicate keyword interface, the duplicate keyword interface including a duplicate keyword selection input for requesting a selection of keywords from the sets of duplicate keywords based on a relative selection criterion that a keyword must satisfy relative to other keywords in its corresponding set of duplicate keywords;

receiving, by the data processing device, a request specifying a keyword selection criterion for selecting the duplicate keywords;

identifying, by the data processing device and based on the keyword selection criterion, at least two disjoint sets of duplicate keywords that each include a duplicate keyword that satisfies the selection criterion;

providing to the user device, by the data processing apparatus, selection data that causes the user device to highlight a proper subset of duplicate keywords in each of the at least two disjoint sets, the proper subset of duplicate keywords from each disjoint set that are highlighted being only those duplicate keywords that satisfy the selection criterion;

receiving, by the data processing device, a single action request to modify an attribute value of the highlighted duplicate keywords in each of the at least two disjoint sets; and modifying, within each particular set of the at least two disjoint sets of duplicate keywords, the attribute value for the highlighted keywords, the modification being performed in response to the single action request.

16. A system, comprising:
a data store storing sets of duplicate keywords for an advertising account, each set of duplicate keywords including keywords having common matching text for the set; and a duplicate keyword selection system comprising one or more processors configured to:
identify two or more different sets of duplicate keywords including duplicate keywords that satisfy a selection criterion;
receive a single action request to modify an attribute value of a proper subset of duplicate keywords in each of the identified two or more different sets of duplicate keywords, the proper subset of duplicate keywords in each of the two or more different sets of duplicate keywords being only those keywords that satisfy the selection criterion; and modify, within each particular set of the two or more different sets of duplicate keywords, attribute values for the proper subset of duplicate keywords in the particular set, the modification being performed in response to the single action request.

17. The system of claim 16, wherein the duplicate keyword selection system is implemented in a client device.

18. The system of claim 17, wherein the duplicate keyword selection system is further configured to provide modifications of the attribute values to a server.

19. The system of claim 16, wherein the duplicate keyword selection system is implemented in a server device.

20. The system of claim 19, wherein the duplicate keyword selection system is further configured to provide, to a user device, duplicate keyword interface instructions that cause the user device to display the two or more different sets of duplicate keywords in a duplicate keyword interface, the duplicate keyword interface including a duplicate keyword selection input for requesting a selection of keywords from the different sets of duplicate keywords based on a relative selection criterion that a keyword must satisfy relative to other keywords in its corresponding set of duplicate keywords.

21. The system of claim 20, wherein the duplicate keyword selection system is further configured to provide, to a user device, selection data that causes the user device to highlight a duplicate keyword each of the two or more different sets of duplicate keywords.

22. The system of claim 16, wherein the selection criterion specifies a relative attribute value for at least one attribute selected from a group consisting of a quality score, a keyword word count, a targeting match type, an advertisement group to which each keyword belongs, a status of each keyword specifying whether the keyword is active or paused, a status of the advertisement group, and a campaign to which each keyword belongs.

23. The system of claim 16, wherein the duplicate keyword selection system is further configured to highlight the proper subset of duplicate keywords in each of the two or more different sets of duplicate keywords.

* * * * *